United States Patent
Longo et al.

(10) Patent No.: US 11,940,253 B2
(45) Date of Patent: Mar. 26, 2024

(54) PROJECTILE PAYLOAD FOR TRAINING AMMUNITION WITH MULTI-SPECTRAL OUTPUT

(71) Applicant: Cyalume Technologies, Inc., West Springfield, MA (US)

(72) Inventors: Joseph Cosimo Longo, Feeding Hills, MA (US); Linda Anne Jacob, Woodbridge, CT (US)

(73) Assignee: Cyalume Technologies, Inc., West Springfield, MA (US)

( * ) Notice: Subject to any disclaimer, the term of this patent is extended or adjusted under 35 U.S.C. 154(b) by 0 days.

(21) Appl. No.: 17/806,168

(22) Filed: Jun. 9, 2022

(65) Prior Publication Data
US 2023/0194226 A1    Jun. 22, 2023

Related U.S. Application Data

(60) Provisional application No. 63/208,785, filed on Jun. 9, 2021.

(51) Int. Cl.
| *F42B 12/40* | (2006.01) |
| *C09K 11/07* | (2006.01) |
| *F42B 12/42* | (2006.01) |

(52) U.S. Cl.
CPC ........... *F42B 12/40* (2013.01); *C09K 11/07* (2013.01); *F42B 12/42* (2013.01)

(58) Field of Classification Search
CPC ...... F42B 8/12; F42B 8/14; F42B 8/16; F42B 12/38; F42B 12/40; F42B 12/42; C09K 11/07; F21K 2/06
USPC ............................................ 102/513; 362/34
See application file for complete search history.

(56) References Cited

U.S. PATENT DOCUMENTS

| H114 H | 8/1986 | Quintavalle |
| 5,565,649 A | 10/1996 | Tougeron et al. |
| 6,497,181 B1 | 12/2002 | Manole et al. |
| 6,990,905 B1 | 1/2006 | Manole et al. |
| 7,055,438 B1 | 6/2006 | Manole et al. |
| 7,475,638 B2 | 1/2009 | Haeselich |
| 7,487,728 B2 | 2/2009 | Cranor |
| 7,819,065 B2 | 10/2010 | Haeselich |
| 8,297,187 B2 * | 10/2012 | Sullivan ................ F42B 12/40 102/370 |
| 8,376,561 B2 | 2/2013 | Longo |
| 8,438,978 B2 * | 5/2013 | Sullivan ................ F42B 12/40 102/513 |
| 8,584,590 B2 | 11/2013 | Cranor et al. |

(Continued)

FOREIGN PATENT DOCUMENTS

| EP | 2630436 | 8/2013 |
| WO | WO2012061065 | 5/2012 |

*Primary Examiner* — James S Bergin
(74) *Attorney, Agent, or Firm* — McHale & Slavin, P.A.

(57) ABSTRACT

A chemiluminescent projectile having multi-spectral output, including daytime viewable, nighttime viewable and thermal outputs. The chemiluminescent projectile has a payload that permits the visualization of the fired projectile using a variety of detecting methods including human vision, night vision equipment/infrared devices, and thermal detecting devices during day and night conditions. The chemiluminescent projectile comprises a body having reagents that produce both chemiluminescent and exothermic reactions that generate light and heat sufficient to act as a visual and thermal marker.

15 Claims, 1 Drawing Sheet

(56) References Cited

U.S. PATENT DOCUMENTS

| | | | |
|---|---|---|---|
| 8,584,591 B2 | 11/2013 | Cranor et al. | |
| 9,074,857 B2 * | 7/2015 | Cranor | F42B 12/40 |
| 9,090,821 B2 | 7/2015 | Cranor et al. | |
| 10,845,172 B2 * | 11/2020 | Moreno | F42B 12/40 |
| 11,639,845 B2 * | 5/2023 | Bruno | F42B 12/50 |
| | | | 102/513 |
| 2010/0282118 A1 | 11/2010 | Ladyjensky et al. | |

* cited by examiner

PROJECTILE PAYLOAD FOR TRAINING AMMUNITION WITH MULTI-SPECTRAL OUTPUT

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 63/208,785 entitled "PROJECTILE PAYLOAD FOR TRAINING AMMUNITION WITH MULTI-SPECTRAL OUTPUT" filed Jun. 9, 2021. The contents of the above referenced application are incorporated herein by reference in its entirety.

FIELD OF THE INVENTION

The present invention relates to projectiles and ammunition; to a chemiluminescent projectile having multi-spectral output; and more particularly, to a projectile having a payload that permits the visualization of the fired projectile using a variety of detecting methods including human vision, night vision equipment/infrared devices, and thermal detecting devices during day and night conditions.

BACKGROUND OF THE INVENTION

Military personnel, as well as law enforcement personnel, require constant weapons training to ensure an effective fighting force. In addition to ensuring an individual's accuracy in striking intended targets, devices for determining the effectiveness of various equipment systems and as a means of calibrating such systems, further ensure a more effective fighting force. Training with actual weapons is vital to this goal. While virtual training systems are useful, the ability to use actual weapons and the ammunition one uses while out on the battlefield or out on the streets enhances one's weapon-use capabilities.

During the Korean War, the Department of Defense (DoD) developed a warhead consisting of a metal slug with an impact fuse and small explosive charge. The flight characteristics were similar to the 40 mm round used in the field and allowed troops in training to see the impact location of the round in day or night. While this ammunition provided a much-needed practice tool, use in the fields suffered major drawbacks. As estimated by the DoD, approximately 5% of the 40 mm training rounds had fuses that failed to detonate on impact. Such failure rates were not unique to 40 mm caliber round. The unexploded ordinance represented a substantial hazard to soldiers training in the area since these rounds could and often did explode when stepped on. This resulted in a number of soldiers being injured and losing a foot during training. These unexploded rounds have also hindered firefighters in their attempts to control wildfires. According to the BLM Alaska Fire Service in April-May of 2019, a burning area in the Oregon Lakes Fire was off-limits to firefighters and low-flying fire suppression aircraft due to unexploded ordinance in the area. These are two of the reasons that training can be restricted during summer or dry months.

In the 1990's, a 20 mm day/night air-gun launched marking round, the M-303 weapon system, was developed as a training tool using chemical light. This system provided proof-of-concept that chemical light was an acceptable payload for DoD munitions. With the acceptance of chemical light for use in munitions, additional training rounds were developed, such as M1110, a 40 mm low velocity (LV) training round and MK281, 40 mm high velocity (HV) training round. The payload of the rounds consisted of two components: 1) a chemical light reaction that allowed the round and its impact to be viewed at night, and 2) a high lofting orange powder that provided daytime visibility and enhanced the nighttime signature by fluorescence of the light of the chemiluminescent reaction.

As the development of chemical light rounds progressed, several issues arose that required solutions. The first was a consequence of the kinetics of the chemiluminescent chemistry that makes the light. The speed or rate of a chemical reaction is expressed by the Arrhenius equation. Essentially, at a higher temperature, more collisions occur between molecules which are moving at higher speeds. Besides producing more collisions, at higher temperatures, a greater percentage of the collisions have greater energy, making them more likely to have sufficient energy (energy of activation) for the chemical reaction to be possible. Lower temperatures will have the opposite effect, slowing the rate of reaction. At low enough temperatures, the reaction may even come to a halt. This meant that the performance of the round varied depending upon the temperature of the payload prior to firing. The environmental temperature problem was addressed by the technology described in U.S. Pat. Nos. 8,584,590 and 8,584,591. By incorporating a thermal component into the chemistry, the payload attained elevated temperature moments after firing. Accordingly, a round fired in a northern region during the winter would perform similarly to one fired during a training exercise in a hot desert in the summer.

In addition to the issues related to environmental temperatures, the degradation of the catalytic system and the affect this would have on shelf life was a concern for chemical light based munitions. There was need for these types of training munitions to have at least a 5-year shelf life, and have better visibility at a 3 km distance for the high velocity round. U.S. Pat. No. 9,090,821 attempted to address such need by the development of an enhanced catalytic system. With the new chemistry, a better shelf life and light output was provided. Accordingly, training sessions using such chemical light based rounds were visible in cool morning conditions and hot summer ranges. While an improvement to the issues related to environmental temperatures, weapons using such chemical based munitions was not viable due to the barrel of the gun rising upon pulling the trigger, blocking the shooter's view of the glowing projectile for the brief time it spent in the air.

As soldier-wearable thermal cameras were starting to be introduced into the field, a thermal signature, as well as visual and night vision goggles (NVG) readable signatures, was required for use as the next generation training munition. As development of 40 mm LV and HV day/night/thermal (D/N/T) training rounds began, several issues arose. The 40 mm LV round flew well and was visible in the day, and through NVG equipment, at all tested distances. However, the thermal signature was inadequate.

Accordingly, development of an improved non-pyrophoric thermal signature that would be visible at greater distances, but incapable of starting fires with celluloid materials, was needed.

SUMMARY OF THE INVENTION

A chemiluminescent projectile having multi-spectral output, including daytime viewable, nighttime viewable, and thermal outputs. The chemiluminescent projectile has a payload that permits the visualization of the fired projectile (during flight, upon impact and/or to the area/object of impact) using a variety of detecting methods including human vision, night vision equipment/infrared devices, and thermal detecting devices during day and night conditions. The chemiluminescent projectile comprises a body having reagents that produce both chemiluminescent and exothermic reactions that generate light and heat sufficient to act as a visual and thermal marker.

In one illustrative embodiment of the invention, a chemiluminescent system having multi-spectral output comprises, a first chemiluminescent composition comprising at least one oxalate ester and at least one fluorescer; a second chemiluminescent composition comprising at least one peroxide and at least one catalyst, wherein light is emitted when said first chemiluminescent composition interacts with the second chemiluminescent composition; at least one thermal producing chemical, upon interaction with the first chemiluminescent composition or the second chemiluminescent composition produces heat but does not interfere with the production of light; an inert ballast material; and a chemical dispersant visualizing agent.

In one illustrative embodiment of the invention, chemiluminescent projectile having multi-spectral output, comprises, an insert having first chemiluminescent light generating component separated from a second chemiluminescent light generating component via a breakable barrier, said first chemiluminescent light generating component comprising at least one oxalate ester and at least one fluorescer, the second chemiluminescent light generating component comprising at least one peroxide and at least one catalyst, said second chemiluminescent light generating component interacting with the first chemiluminescent light generating component to generate light; an inert ballast material surrounding the insert; at least one inorganic salt at a concentration sufficient to produce an exothermic reaction when the first and second chemiluminescent light generating components interact, said at least one inorganic salt forming part of the first chemiluminescent light generating component, intermixed with the inert ballast material, or forming part of the first chemiluminescent light generating component and intermixed with the inert ballast material; and a chemical dispersant visualizing agent constructed and arranged to disperse, and thus provide visualization of, the heat or chemical light reactions upon impact with a target in a vertical direction or plane, a horizontal direction or plane, or in vertical and horizontal directions or planes.

In one illustrative embodiment of the invention, a method of marking a target, comprises the steps of: launching a chemiluminescent projectile having multi-spectral output, the chemiluminescent projectile comprising, a first chemiluminescent composition comprising at least one oxalate ester and at least one fluorescer, a second chemiluminescent separated from the first chemiluminescent composition by a barrier and comprising at least one peroxide and at least one catalyst, wherein light is emitted when the first chemiluminescent composition interacts with the second chemiluminescent composition, at least one thermal producing chemical, upon interaction with the first chemiluminescent composition or the second chemiluminescent composition produces heat but does not interfere with the production of light; an inert ballast material, and a chemical dispersant visualizing agent; breaking the barrier separating the first chemiluminescent composition and the first chemiluminescent composition; generating light and heat by reaction of between the first chemiluminescent composition, the second chemiluminescent composition, and the at least one thermal producing chemical; and dispersing the light and heat in a vertical direction, a horizontal direction, or in vertical and horizontal directions upon contact of the chemiluminescent projectile with the target.

Accordingly, it is an objective of the invention to provide a projectile having multi-spectral outputs.

It is a further objective of the invention to provide a projectile having multi-spectral outputs, including daytime viewable, nighttime viewable, and thermal outputs.

It is yet another objective of the invention to provide a chemiluminescent projectile having multi-spectral outputs, including daytime viewable, nighttime viewable, and thermal outputs.

It is a still further objective of the invention to provide a chemiluminescent projectile having multi-spectral outputs, and which has one or more agents, particles or objects which enhance visualization of the day, night, and thermal signals in a vertical direction or plane upon impact.

It is a further objective of the invention to provide a chemiluminescent projectile having multi-spectral outputs and which has one or more agents, particles or objects which enhance visualization of the day, night, and thermal signals in a horizontal direction or plane upon impact.

It is yet another objective of the invention to provide a chemiluminescent projectile having multi-spectral outputs, and which has one or more agents, particles or objects which enhance visualization of the day, night, and thermal signals in both vertical and horizontal directions or planes upon impact.

Other objectives and advantages of the invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

While the invention is susceptible of embodiment in various forms, there is shown in the drawings and will hereinafter be described a presently preferred, albeit not limiting, embodiment with the understanding that the disclosure is to be considered an exemplification of the invention and is not intended to limit the invention to the specific embodiments illustrated.

As used herein, use of "about" or "roughly" includes a value or amount which is up to 20% higher or lower than the stated numerical value or amount.

Figure 1:
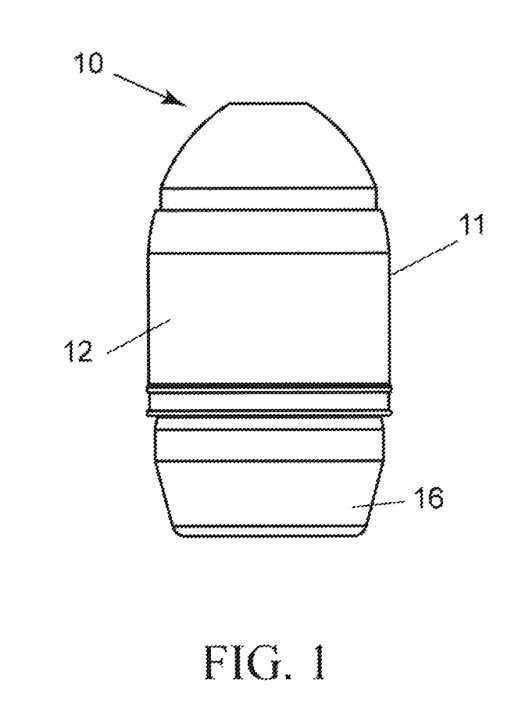
FIG. 1 is an illustrative embodiment of a projectile having multi-spectral output (Day/Night/Thermal round with the chemiluminescent chemicals)

Referring to FIG. 1, an illustrative embodiment of a Day/Night/Thermal projectile with chemiluminescent chemicals, referred to generally as a chemiluminescent projectile having multi-spectral output 10, is shown. The chemiluminescent projectile having multi-spectral output 10 allows a user the ability to view the projectile using multiple methods, including the human eye and/or the use of cameras and scopes (vehicle mounted and man-wearable) to provide amplification, if needed, based upon the distance of flight to impact. The chemiluminescent projectile having multi-spectral output 10 may be designed to provide daylight visibility, nighttime visibility, and a thermal footprint upon firing from a weapon, upon contact with a target, or upon firing from a weapon and upon impact with a target. The chemiluminescent projectile having multi-spectral output 10 may be a bullet and be configured to be part of a cartridge for use as ammunition to be loaded in a firearm or other weapon that fires bullets or rounds or shells. As such, the chemiluminescent projectile having multi-spectral output 10 may be used in military training, non-military training, such as police training, in tactical operations, and on a battlefield.

For any chemiluminescent based ammunition or round, the chemistry for the light producing reaction is typically contained in a compartment in the nose of the projectile, or bullet. Multiple compartments can be obtained by stacking or nesting different components within the space available. As long as the weight and center of gravity form a suitable and successful design, changes to the constituents can be made without affecting performance. Accordingly, the chemiluminescent projectile having multi-spectral output 10 may be adaptable to various sized projectiles or cartridges and may be adapted for use with different types of weapons.

The chemiluminescent projectile having multi-spectral output 10 may comprise a body 11 having a nose cone or ogive 12. The nose cone or ogive 12 is preferably made of plastic, however, other materials known to one of skill in the art may be used. The nose cone or ogive 12 may be hollow or partially hollow to receive or hold therein one or more components, chemicals, or chemical solutions. The chemiluminescent projectile having multi-spectral output 10 may be a part of ammunition, and thus be configured to be placed in casing (with propulsive charge), or adapted in any manner known to one of skill in the art, when used for firearms or adapted to other weapons. If the chemiluminescent projectile having multi-spectral output 10 is used as a bullet, the body 11 may be any size or caliber known to one of skill in the art. An internal portion 14 of the chemiluminescent projectile having multi-spectral output 10 comprises several components that provide projectile functionality, i.e. produce daylight visibility, nighttime visibility, and a thermal footprint. The chemiluminescent projectile having multi-spectral output 10 may be identified using both thermal and night vision goggles upon activation, i.e., when the chemical reaction between the multiple components start. Attached or secured to the nose cone or ogive 12 is a zinc base 16. The zinc base 16 provides necessary mass and enables interfacing with the casing that contains a propulsive charge. The zinc base 16 may include a foil 17. The foil 17 seals to insert 18 to contain the components stored therein, i.e. the activator composition 24, keeping it separated from the zinc base 16 until setback occurs at firing. The zinc base may include a void area 19. The void area 19 may be constructed and arranged to provide the necessary overall mass and center of gravity for the chemiluminescent projectile having multi-spectral output 10. The zinc base 16 may include a force concentrating structure 21, illustrated herein as a protrusion in the zinc base 16. In use, ampoule 22 (described below) ruptures the foil 17 due to inertia setback. The force concentrating structure 21 ensures ample 22 ruptures.

The chemiluminescent projectile having multi-spectral output 10 is composed of at least a multiple part chemiluminescent light and heat generating system separated until activation. The first part may comprise at least one oxalate ester, at least one fluorescer, and may have at least one inorganic salt in an organic carrier solvent. This is the oxalate composition 22 (may also be referred to as first chemiluminescent composition/first chemiluminescent light generating component). The second part may comprise at least one peroxide and at least one catalyst in an organic carrier solvent. This is the activator composition 24 (may also be referred to as second chemiluminescent composition/second chemiluminescent light generating component).

The chemiluminescent projectile having multi-spectral output 10 may provide for light and heat to be emitted instantly when the two parts intermix. The chemiluminescent projectile having multi-spectral output 10 may provide for a projectile that reaches a peak emission of light and heat when the two parts of the system are completely mixed. The chemiluminescent projectile having multi-spectral output 10 may provide for a projectile which emits light at multiple wavelengths, including multiple wavelengths in the infrared spectrum, the visible spectrum, or a combination thereof.

The light and heat of the chemiluminescent projectile having multi-spectral output 10 may, in certain embodiments, last for approximately 2 minutes, for up to 20 minutes, or for up to 30 minutes.

In the oxalate composition 22, examples of the at least one oxalate include bis(2,4,5-trichloro-6-carbopentoxyphenyl) oxalate; bis(2,4,5-trichlorophenyl)oxalate; bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl) oxalate; bis (3-trifluoromethyl nitrophenyl)oxalate; bis(2-methyl-4,6-dinitrophenyl)oxalate; bis(1,2-dimethyl-4,6-dinitrophenyl) oxalate; bis(2,4-dichlorophenyl)oxalate; bis(2,4-dinitrophenyl)oxalate; bis(2,5-dinitrophenyl)oxalate; bis(2-formyl-4-nitrophenyl)oxalate; bis(pentachlorophenyl) oxalate; bis(1,2-dihydro-2-oxo-1-pyridyl)glyoxal; bis(2,4-dinitro-6-methylphenyl)oxalate; bis-N-phthalimidyl oxalate, bis{3,4,6-trichloro-2-[(2-methyl propoxy)carbonyl] phenyl}oxalate; bis{3,4,6-trichloro-2-[(cyclopropylmethoxy)carbonyl] phenyl}oxalate; bis{3,4,6-trichloro-2-[(2-methylbutoxy)carbonyl] phenyl}oxalate; bis{3,4,6-trichloro-2-[(3-methylbutoxy)carbonyl] phenyl}oxalate; bis{3,4,6-trichloro-2-[(2,2-dimethylpropoxy)carbonyl] phenyl}oxalate; bis{3,4,6-trichloro-2-[(2-methylpentyloxy) carbonyl] phenyl}oxalate; bis{3,4,6-trichloro-2-[(3-methylpentyloxy)carbonyl] phenyl}oxalate; bis{3,4,6-tri chloro-2-[(4-methylpentyloxy)carbonyl] phenyl}oxalate; bis{3,4,6-trichloro-2-[(3,3-dimethylbutoxy)carbonyl] phenyl}oxalate; bis{3,4,6-trichloro-2-[(2-ethylbutoxy)carbonyl] phenyl}oxalate; bis{3,4,6-trichloro-2-[(cyclopentylmethoxy)carbonyl] phenyl}oxalate; bis{3,4,6-trichloro-2-[(2-methylhexyloxy)carbonyl] phenyl}oxalate; bis{3,4,6-trichloro-2-[(3-methylhexyloxy)carbonyl] phenyl}oxalate; bis{3,4,6-trichloro-2-[(4-methylhexyloxy)carbonyl] phenyl}oxalate; bis{3,4,6-trichloro [(5-methylhexyloxy) carbonyl] phenyl}oxalate; bis{3,4,6-trichloro-2-[(cyclohexylmethoxy)carbonyl] phenyl}oxalate; bis{3,4,6-trichloro-2-[(phenylmethoxy)carbonyl] phenyl}oxalate; bis{3,4,6-trichloro-2-[(2-phenylethoxy)carbonyl] phenyl}oxalate; bis (3,4,6-trichloro-2-{[(2-methylphenyl)methoxy]carbonyl} phenyl)oxalate; bis(3,4,6-trichloro-2-{[(3-methylphenyl) methoxy]carbonyl} phenyl)oxalate; bis(3,4,6-trichloro-2-{ [(4-methylphenyl)methoxy]carbonyl} phenyl)oxalate; bis (3,4,6-trichloro-2-{[(2,3-dimethylphenyl)methoxy] carbonyl}phenyl)oxalate; bis(3,4,6-trichloro-2-{[(2,4-dimethylphenyl)methoxy] carbonyl}phenyl)oxalate; bis(3,4,6-trichloro-2-{[3,4-dimethylphenyl) methoxy]

carbonyl}phenyl) oxalate; bis(3,4,6-trichloro-2-{[(3,5-dimethylphenyl)methoxy] carbonyl}phenyl)oxalate; bis(3,4,6-trichloro-2-{[(2,6-dimethylphenyl)methoxy] carbonyl}phenyl)oxalate; bis(3,4,6-trichloro-2-{[(2-ethylphenyl)methoxy]carbonyl}phenyl)oxalate; bis(3,4,6-trichloro-2-{[(3-ethylphenyl)methoxy]carbonyl} phenyl) oxalate; bis(3,4,6-trichloro-2-{[(4-ethylphenyl)methoxy] carbonyl} phenyl)oxalate; bis(3,4,6-trichloro-2-{[2-(2-methylphenyl)ethoxy]carbonyl} phenyl)oxalate; bis(3,4,6-trichloro-2-{[2-(3-methylphenyl)ethoxy]carbonyl} phenyl) oxalate; bis(3,4,6-trichloro-2-{[2-(4-methylphenyl)ethoxy] carbonyl} phenyl)oxalate; bis{3,4,6-trichloro-2-[(2-phenylpropoxy)carbonyl] phenyl}oxalate; bis{3,4,6-trichloro [(3-phenylpropoxy)carbonyl] phenyl}oxalate; bis{3,4,6-trichloro-2-[1-naphthalenylmethoxy)carbonyl] phenyl}oxalate; bis{3,4,6-trichloro-2-[2-naphthalenylmethoxy)carbonyl] phenyl}oxalate; bis{3,4,6-trichloro-2-[(2,2-diphenylethoxy)carbonyl] phenyl}oxalate; bis{3,4,6-trichloro-2-[(9-fluorenylmethoxy)carbonyl] phenyl}oxalate; and bis{3,4,6-trichloro-2-[(9-anthracenylmethoxy)carbonyl] phenyl}oxalate and mixtures thereof.

In the oxalate composition 22, examples of the at least one fluorescer include 1-methoxy-9,10-bis(phenylethynyl) anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4-methoxyphenyl)anthracene; 9,10-bis(phenylethynyl) anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-dineopentyl-3,4,9,10-perylene dicarboximide; 1,6,7,12-tetra(p-t-butylphenoxy)-N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'-bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene, and mixtures thereof.

In the oxalate composition 22, examples of the at least one carrier solvent include, but are not restricted to, propylene glycol dialkyl ether containing one to three propylene moieties, and each alkyl group is independently a straight-chain or branched-chain alkyl group containing up to eight (8) carbon atoms, propylene glycol dialkyl ethers containing two propylene moieties such as dipropylene glycol dimethyl ether, dipropylene glycol diethyl ether and dipropylene glycol di-t-butyl ether, dibutyl phthalate, butyl benzoate, propylene glycol dibenzoate, 2-ethylhexyl diphenyl phosphate, dimethyl phthalate, dibutyl phthalate, dioctyl phthalate, butyl benzoate, acetyl triethyl citrate, triethyl citrate, ethylene glycol dibenzoate, and propylene glycol dialkyl ether containing one to three propylene moieties, and each alkyl group is independently a straight-chain or branched-chain alkyl group containing up to eight (8) carbon atoms and mixtures of any of the afore mentioned compounds.

Figure 2:
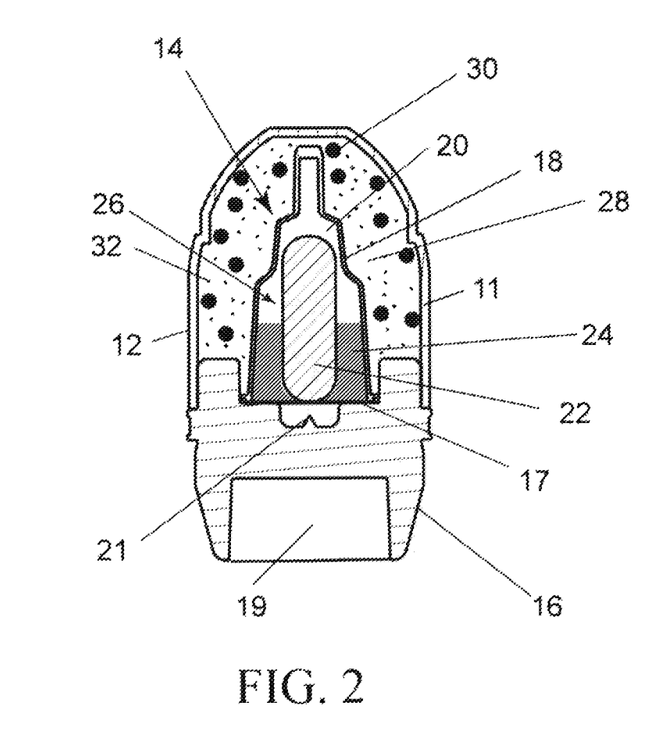
FIG. 2 is an illustrative embodiment of a payload of the projectile having multi-spectral output (Day/Night/Thermal round with the chemiluminescent chemicals) illustrated in FIG. 1.

For the component that provides the thermal energy 32 when it reacts with the activator composition, examples may include but are not limited to at least one inorganic salt to include sodium thiosulphate, potassium thiosulphate, cobalt acetate, copper acetate, lead acetate, cupric chloride, ferric chloride, cobalt acetate, iron pentanedionate, calcium oxide, lithium hydroxide, and silver nitrate.

In the activator composition 24, examples of the at least one catalyst includes sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichloro-salicylate; magnesium-3,5,6-trichlorosalicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, tribenzylamine, dibenzylethylamine, dibenzylmethylamine, and mixtures thereof. As used herein, the term "substituted" refers to a group in which one or more hydrogen atoms are independently replaced with the same or different substituent(s). Typical substituents include, for example, X and R, wherein where each X is independently chosen from a halogen atom; and each R is independently chosen from hydrogen, an alkyl group, and a substituted alkyl group. As used herein, an "alkyl group" refers to a saturated or unsaturated, branched, straight-chain or cyclic monovalent hydrocarbon group derived by the removal of one hydrogen atom from a single carbon atom of a parent alkane. Typical alkyl groups include, for example, methyl, ethyl, propyl, butyl, and the like. In certain embodiments, the alkyl group comprises from 1 to 20 carbon atoms.

In the activator composition 24, examples of the at least one peroxide includes but are not limited to hydrogen peroxide, sodium peroxide, sodium perborate, sodium pyrophosphate peroxide, urea peroxide, histidine peroxide, t-butylhydroperoxide, sodium percarbonate; peroxybenzoic acid, and mixtures thereof.

In the activator composition 24, examples of the at least one carrier solvent includes but are not limited to dimethyl phthalate with tert-butanol, triethyl citrate, ethylene glycol dibenzoate, methyl-2-hydroxyl-2-methyl propanoate, ethyl 2-hydroxy-2-methylpropanoate, diethylene glycol diethyl ether, diethylene glycol dibutyl ether, and mixtures thereof.

Additional components that may be present in either component of the chemiluminescent projectile having multi-spectral output 10 include, but are not limited to, thickeners (such as but not limited to arrowroot, guar gum, fumed silica, karaya, tapioca, and tragacanth) to allow the marker to stick to the target better, high lofting fluorescent powders that may be of melamine or polyamide and fluorescer composition for daytime target marking.

The chemiluminescent projectile having multi-spectral output 10 includes an insert 18, preferably a plastic insert. Optionally, the nose cone or ogive 12 may include a high lofting fluorescent powder for visualization of the impact area during daytime. The insert 18 is designed to hold the reagents for the thermal and chemiluminescent reactions. Preferably, the insert 18 prevents intermixing of components/chemicals outside of the insert 18, unless and until mixing of components/chemicals is needed or desired. The insert 18 may be designed to be a breakable unit if required. To keep the chemicals separate until firing, some of the chemical components within the insert 18 are contained in a breakable container 20, illustrated herein as a sealed plastic or glass ampoule. The first chemical components 22 (may also be referred to as the oxalate ampoule components 22), which include at least one oxalate ester, at least one fluorescer, and optionally, thermal producing components, such as at least one inorganic salt, are stored in the sealed plastic or glass ampoule 20. The thermal producing component(s) must be a chemical(s) that produces heat but does not interfere with the production of chemical light. The second activator components 24 are stored within the interior portion 26 of the insert 18.

The remaining material placed within the interior 14 of the ogive body 12 is an inert ballast 28 consisting of a calcium carbonate material or form, preferably a marble dust. Marble dust is composed mainly of calcium carbonate in a dense and highly compacted form. The fine marble dust granules help cushion the ampoule during shipping and disperse the material of the chemical light reaction upon impact. The marble dust also stabilizes the body 12 so that any liquid within does not slosh around when fired and traveling towards and prior to impact with a target or object. In an illustrative embodiment of the chemiluminescent projectile having multi-spectral output 10, marker dye may also be mixed in or included with the inert ballast 28.

The chemiluminescent projectile having multi-spectral output 10 also includes vertical, horizontal, or vertical and horizontal chemical dispersant visualizing agents 30, illustrated herein as prills, or rounded or spherical shaped objects, materials, or particles that bounce in or along a vertical direction or plane, horizontal direction or plane, or vertical and horizontal directions or planes. The chemical dispersant visualizing agent 30 provides visualization upon impact with a target in a vertical direction or plane, a horizontal direction or plane, and most preferably, in vertical and horizontal directions or planes. In an illustrative embodiment of the chemiluminescent projectile having multi-spectral output 10, the vertical, horizontal, or vertical and horizontal chemical dispersant visualizing agent 30 may have a porous surface to insulate heat generated by the chemical reactions from dissipating too fast. Accordingly, when the chemiluminescent projectile having multi-spectral output 10 is fired from a weapon and the chemical reactions are occurring, generating day/night and thermal energy, and hit a target or object such as the ground, the chemicals will bounce off the target, allowing better visualization of the impact area, whether using the human eye or cameras or scopes. In a preferred illustrative embodiment, the vertical, horizontal, or vertical and horizontal chemical dispersant visualizing agent 30 is a limestone (Calcium Carbonate) or other form of Calcium Carbonate. In a more preferred illustrative embodiment, the vertical, horizontal, or vertical and horizontal chemical dispersant visualizing agent 30 is a prilled form of limestone (Calcium Carbonate) or other form of Calcium Carbonate.

The chemiluminescent projectile having multi-spectral output 10 is configured to produce enough heat, generated by reagents of the thermal reaction during firing, to ensure the chemiluminescent reaction proceeds rapidly and to heat the entire mass of the ballast to a high enough temperature to be detected by thermal cameras at the distance required, or for a long enough time (several seconds) to be captured at the frame rates employed by the cameras used. In producing sufficient heat, consideration may take into account that the weight of the chemicals being carried in the nose cone or ogive 12 should not be greatly altered. Doing so could adversely affect the ballistics of the chemiluminescent projectile having multi-spectral output 10 or round. Therefore, depending upon the design of the chemiluminescent projectile having multi-spectral output 10, the total weight of chemicals described in the following tables is preferably between 15 to 25 grams. All weights are presented as percentages of the total payload in the interior 14 of the nose cone or ogive 12.

An excess of hydrogen peroxide provided as part of the activator portion of the chemiluminescent reaction could provide a possible solution to the lack of heat density. Alternatively, compounds that react with hydrogen peroxide to produce heat without interfering with the chemical light reaction may be placed outside of the oxalate ampoule 20. Such compounds may be an inorganic salt, such as sodium thiosulfate, potassium thiosulphate, cobalt acetate, copper acetate, lead acetate, cupric chloride, ferric chloride, calcium iodide, potassium iodide, and silver nitrate. In a preferred embodiment, the chemiluminescent projectile having multi-spectral output 10 includes sodium thiosulfate. Some of the marble dust ballast 28 was replaced with sodium thiosulfate. As illustrated in FIG. 2, the sodium thiosulfate 32 (for example, 0.2-0.6 g) is shown mixed in with the marble dust ballast 28. Accordingly, the sodium thiosulfate 32 is placed outside of the insert 18. While the majority of the sodium thiosulfate 32 is placed outside of the insert 18, in some embodiments of the chemiluminescent projectile having multi-spectrum output 10, some sodium thiosulfate 32 may also be placed with in the oxalate ampoule 20 with the oxalate composition 22. In some embodiments of the chemiluminescent projectile having multi-spectral output 10, sodium thiosulfate placed within the interior 14 may be mixed with an additional thermal producing component(s). As described above, the thermal producing component(s)

must be a chemical(s) that produces heat in combination with a peroxide but does not interfere with the production of chemical light.

As provided in Table 1, illustrative examples of the reaction of salts and compounds known to generate heat with water and peroxide without interfering with the chemical light reaction were tested with and without the inclusion of sodium thiosulfate.

Analysis of the video showed a distinguishable thermal signature, and the light generated was easily visible at that distance for over 30 seconds.

During the test, it was noticed that much of the mixture fell off the vertical surface. For the rounds to be tested in the field, it was decided to alter the rheology of some of the samples to make the material "stickier". The third and fourth tests introduced the addition of varying combinations of a derivatized fumed silica, CELITE®, arrowroot, tapioca,

TABLE 1

Thermal Formulation Trial

| Run # | Marble dust (wt %) | Compound 1 (wt %) | Compound 2 (wt %) | Solvent (wt %) | Highest Temperature (° F.) | Temperature (° F.) at 1 minute |
|---|---|---|---|---|---|---|
| 1A | 52% | Sodium thiosulfate 39% | 0% | 6.5% H2O2 (9%) | 172 | 135 |
| 1B | 52% | Sodium thiosulfate 26% | Calcium oxide 13% | 6.5% H2O2 (9%) | 188 | 145 |
| 1C | 52% | Sodium thiosulfate 26% | Calcium oxide 13% | 6.5% H2O2 (9%) | 172 | 119 |
| 1D | 52% | Lithium hydroxide 13% | Calcium oxide 26% | 10% H2O2 (9%) | 121 | 90.1 |
| 1E | 52% | Sodium thiosulfate 39% | 0% | 10% H2O2 (9%) | 215 | 135 |
| 1F | 52% | Sodium thiosulfate 26% | Calcium oxide 13% | 10% H2O2 (9%) | 215 | 129 |
| 1G | 52% | Sodium thiosulfate 26% | Calcium oxide 13% | 10% H2O2 (9%) | 123 | 91 |
| 1H | 52% | Lithium hydroxide 13% | Calcium oxide 26% | Munitions activator$^a$ (9%) | 113 | 90 |
| 1I | 52% | Sodium thiosulfate 39% | 0% | Munitions activator$^a$ (9%) | 243 | 191 |
| 1J | 52% | Sodium thiosulfate 26% | Calcium oxide 13% | Munitions activator$^a$ (9%) | 113 | 103 |
| 1K | 52% | Sodium thiosulfate 26% | Calcium oxide 13% | Munitions activator$^a$ (9%) | 105 | 93 |

$^a$Munitions activator consisting of triethyl citrate with aqueous hydrogen peroxide and sodium salicylate and tribenzylamine as described in U.S. Pat. No. 9,090,821.

Initial tests were done in the lab using magnetic stirring to enable rapid analysis of a wide variety of mixtures. The dry components were placed into a 250 mL plastic beaker with a magnetic stir bar. The solvent with the peroxide was the last component added, and the time was recorded after this addition. Temperatures were measured using a FLIR i50 camera. Table 1 shows combinations that produced a temperature of at least 100° F. sometime during the experiment. Sodium thiosulfate on its own (entry 1I) produced the best results of the formulations tested.

Additional tests were performed to determine if the combined thermal and chemiluminescent reagents could generate enough of a signature to be viewed at a distance. It was also important to determine whether the higher temperatures generated caused the light output to be extinguished too soon, interfering with that signature. The other component needed for the chemiluminescent reaction is a mixture of an oxalate ester, an ester solvent, and a suitable dye. This will be referred to as the oxalate solution. At an indoor setting, a thermal camera was placed 300 feet from the test surface and operated in video mode. For this test, the formula used in 1I in Table 1 was combined with the same ratio of oxalate solution used in the LV chemiluminescent projectile used by the United States Marine Core (USMC) as part of the "M1110 40×46 day/night cartridge". After mixing the components, they were manually splashed onto a vertical target.

karaya, tragacanth, and guar gum, to the mixture. As described previously, except for the activator, all ingredients including the oxalate solution were placed into a container with a magnetic stir bar. All of the runs in Table 2 used 2.1 mL of the munitions activator (Table 1) and 1.6 mL of the oxalate solution. Representative runs, where the duration of temperature remained above 120° F. for at least 2.5 minutes, are reported. The amount of oxalate and activator remained the same for all tests.

TABLE 2

Adjustment of Payload Rheology

| Run # | Marble Dust (wt %) | Sodium Thiosulfate (wt %) | Compound #1 (wt %) | Compound #2 (wt %) | Highest Temperature (° F.) |
|---|---|---|---|---|---|
| 2A | 45% | 34% | 0 | 0 | 251 (avg. 2 tests) |
| 2B | 43% | 32% | Fumed silica (0.7%) | Arrowroot (2.9%) | 187 |
| 2C | 40% | 29% | Fumed silica (0.7%) | Arrowroot (8.7%) | 222 |
| 2D | 43% | 32% | Fumed silica (0.7%) | Tapioca flour (2.9%) | 207 |

TABLE 2-continued

Adjustment of Payload Rheology

| Run # | Marble Dust (wt %) | Sodium Thiosulfate (wt %) | Compound #1 (wt %) | Compound #2 (wt %) | Highest Temperature (° F.) |
|---|---|---|---|---|---|
| 2E | 40% | 29% | Fumed silica (0.7%) | Tapioca flour (8.7%) | 237 |
| 2F | 43% | 32% | Fumed silica (0.7%) | Guar gum (2.9%) | 239 |
| 2G | 40% | 29% | Fumed silica (0.7%) | Guar gum (8.7%) | 237 |
| 2H | 43% | 31% | Celite ® 545 (2.8%) | Guar gum (2.9%) | 227 |
| 2I | 40% | 28% | Celite ® 545 (2.8%) | Guar gum (8.7%) | 257 |
| 2J | 43% | 32% | Fumed silica (0.7%) | Karaya (2.9%) | 213 |
| 2K | 40% | 29% | Fumed silica (0.7%) | Karaya (8.7%) | 242 |
| 2L | 43% | 32% | Fumed silica (0.7%) | Tragacanth (2.9%) | 219 |
| 2M | 40% | 29% | Fumed silica (0.7%) | Tragacanth (8.7%) | 236 |

The mixture with tragacanth (2L) and the controls (1I and 2A) were hand loaded into 40 mm LV training grenades and fired on an approved test range via a M203 grenade launcher at vertical and horizontal targets. Both of these formulations produced a recordable thermal signature at 150 yards on vertical targets that lasted sufficiently long enough to allow clear observation of where the projectile hit the target. The chemiluminescent signature remained sufficient for the unaided eye to see at that distance. Based upon the recorded images and direct observations, the mixture with the added components offered no advantage to the control. Furthermore, 1I was as visible as 2A. Therefore, the additional material offered no discernable advantage and were not used in later tests.

The results on the horizontal targets revealed a problem with the thermal portion of the signature. The chemiluminescent light was lofted into the air with the fluorescent powder. However, this powder is not heat conductive and carried none of the desired thermal signature with it. In addition, the material that generated the heat had the consistency of wet sand. Upon impact, it did not go above ground level and, therefore, gave little or no thermal signature visible to the camera or shooter. In some situations, normal topographical variations and vegetation may obscure the signature of the thermal material.

To overcome such issues with these types of topographies, the heat needed to be transferred during the flight to something that could carry a heat signature above the ground. Energy of the impact was used to carry particles heated by the reaction sufficiently high enough to be seen. This required sturdy, porous, lighter objects with a suitable shape. Suitable shapes may include cubes, irregular 3D shape, dodecahedron, spherical, or similar configurations without being planar in nature. The size or volume of the individual pieces preferably should have one dimension of a minimum of 1 millimeter. The maximum dimension is determined by the packing efficiency within the helmet. In one embodiment, a roughly 1.5 to 3 mm spherical shape was used for material packing and performance.

A prilled form of limestone provided an alternative form of calcium carbonate that met the requirements described above. This did not interfere with the chemiluminescent signature necessary for night visualization. Experiments were carried out to simulate what would happen when the material hit a horizontal pad. This explored the ability of and the ratio of prills needed to carry the heat signature above the impact surface.

To test the effect of using the prills, spherical thin glass containers were filled with oxalate solution, sodium thiosulfate, and varying amounts of prilled limestone and marble dust. The munitions activator (as described in Table I) was added and the container shaken for 5 seconds. It was then dropped through a 12-foot piece of 4-inch pipe to land 24 feet below onto a concrete slab. The concrete slab rested in the bottom at the center of a 4-foot square cardboard container with walls about 2.5 feet in height. The experiment was documented with visual observation, a thermal camera, and the FLIR i50. All experiments were run with the same amount of sodium thiosulfate, oxalate, and activator. Multiple runs of the same formula were made. The results of the testing are summarized in Table 3.

TABLE 3

Effect of Prilled Calcium Carbonate

| Run # | Marble Dust (wt %) | Prilled Limestone (wt %) | Observations |
|---|---|---|---|
| 3A | 45.2% | 0.0 | The material hit the pad and clung to it like wet sand. Very little went more than a couple of inches up before falling back. After 20-25 seconds, the material's highest temperature was 134° F.. |
| 3B | 22.5% | 22.5% | There was a much better dispersion of particles throughout the container. After 20-25 seconds, the material's highest temperature was 160° F.. |
| 3C | 30.5% | 20.3% | Particles were well dispersed throughout the container. In two of the runs some particles bounced out of the container. After 20-25 seconds, the material's highest temperature was 173° F.. |
| 3D | 0.0% | 45.2% | Poor thermal signature compared to all the other runs. |

In this test, both the marble dust and the prills were deemed to be important to the heat signature. The transfer of heat from the marble dust to the prills, and the observation that the prills held onto the heat better, made the combination of forms of calcium carbonate superior to either one alone.

40 mm training grenades were made, as previously, with formula 3C as the payload. These were tested on the approved range and observed at different distances. In these test firings, signatures were observed on both the vertical and horizontal targets visually. Thermal imaging devices were placed at approximately 50 and 150 meters for the vertical targets. Thermal imaging devices were placed to monitor a horizontal pad at approximately 250 meters.

The heat generated by the reactions in the payload and the physical characteristics of the prills to carry that signal above low vegetation resulted in a visible and thermal signature visible from 250 meters in day or night. However, the chemicals used react at a temperature substantially below the combustion temperature of celluloid materials.

This makes the payload chemically and physically incapable of starting fires in dry brush, grass, and other vulnerable areas, or causing more than a second-degree burn under typical DoD training exercise conditions.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A chemiluminescent projectile having multi-spectral output, comprising:
   an insert having a first chemiluminescent light generating component separated from a second chemiluminescent light generating component via a breakable barrier, said first chemiluminescent light generating component comprising at least one oxalate ester and at least one fluorescer, said second chemiluminescent light generating component comprising at least one peroxide and at least one catalyst, said second chemiluminescent light generating component interacting with said first chemiluminescent light generating component to generate light;
   an inert ballast material surrounding said insert;
   at least one inorganic salt at a concentration sufficient to produce an exothermic reaction when said first and second chemiluminescent light generating components interact, said at least one inorganic salt forming part of said first chemiluminescent light generating component, intermixed with said inert ballast material, or forming part of said first chemiluminescent light generating component and intermixed with said inert ballast material; and
   a chemical dispersant visualizing agent constructed and arranged to disperse heat or chemical light reactions upon impact with a target in a vertical direction or plane, a horizontal direction or plane, or in vertical and horizontal directions or planes.

2. The chemiluminescent projectile having multi-spectral output according to claim 1, wherein said inert ballast material is made of calcium carbonate.

3. The chemiluminescent projectile having multi-spectral output according to claim 1, wherein said at least one inorganic salt is sodium thiosulfate, potassium thiosulphate, cobalt acetate, copper acetate, lead acetate, cupric chloride, ferric chloride, calcium iodide, potassium iodide, silver nitrate, or combinations thereof.

4. The chemiluminescent projectile having multi-spectral output according to claim 1, wherein said chemical dispersant visualizing agent is made of limestone or other form of calcium carbonate.

5. The chemiluminescent projectile having multi-spectral output according to claim 1, wherein said chemical dispersant visualizing agent is a prilled form of limestone or other form of calcium carbonate.

6. The chemiluminescent projectile having multi-spectral output according to claim 1, wherein said chemical dispersant visualizing agent has a porous surface.

7. The chemiluminescent projectile having multi-spectral output according to claim 1, wherein said at least one oxalate includes bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis(2,5-dinitrophenyl)oxalate; bis(2-formyl-4-nitrophenyl) oxalate; bis(pentachlorophenyl)oxalate; bis(1,2-dihydro-2-oxo-1-pyridyl)glyoxal; bis(2,4-dinitro-6-methylphenyl)oxalate; bis-N-phthalimidyl oxalate, bis{3,4,6-trichloro-2-[(2-methyl propoxy)carbonyl]phenyl}oxalate; bis{3,4,6-trichloro-2-[(cyclopropylmethoxy)carbonyl] phenyl}oxalate; bis{3,4,6-trichloro-2-[(2-methylbutoxy)carbonyl] phenyl)oxalate; bis(3,4,6-trichloro-2-[(3-methylbutoxy) carbonyl] phenyl}oxalate; bis{3,4,6-trichloro-2-[(2,2-dimethylpropoxy)carbonyl] phenyl}oxalate; bis{3,4,6-trichloro-2-[(2-methylpentyloxy) carbonyl] phenyl)oxalate; bis{3,4,6-trichloro-2-[(3-methylpentyloxy)carbonyl] phenyl}oxalate; bis(3,4,6-tri chloro-2-[(4-methylpentyloxy)carbonyl] phenyl}oxalate; bis{3,4,6-trichloro-2-[(3,3-dimethylbutoxy)carbonyl]phenyl}oxalate; bis{3,4,6-trichloro-2-[(2-ethylbutoxy)carbonyl] phenyl}oxalate; bis{3,4,6-trichloro-2-[(cyclopentylmethoxy)carbonyl] phenyl}oxalate; bis{3,4,6-trichloro-2-[(2-methylhexyloxy)carbonyl] phenyl}oxalate; bis{3,4,6-trichloro-2-[(3-methylhexyloxy)carbonyl] phenyl}oxalate; bis{3,4,6-trichloro-2-[(4-methylhexyloxy)carbonyl] phenyl}oxalate; bis{3,4,6-trichloro-2-[(5-methylhexyloxy) carbonyl] phenyl}oxalate; bis{3,4,6-trichloro-2-[(cyclohexylmethoxy)carbonyl] phenyl}oxalate; bis{3,4,6-trichloro-2-[(phenylmethoxy)carbonyl] phenyl}oxalate; bis{3,4,6-trichloro-2-[(2-phenylethoxy)carbonyl] phenyl}oxalate; bis(3,4,6-trichloro-2-{[(2-methylphenyl)methoxy]carbonyl} phenyl)oxalate; bis(3,4,6-trichloro-2-{[(3-methylphenyl)methoxy] carbonyl} phenyl)oxalate; bis(3,4,6-trichloro-2-{[(4-methylphenyl)methoxy]carbonyl} phenyl)oxalate; bis (3,4,6-trichloro-2-{[(2,3-dimethylphenyl)methoxy] carbonyl}phenyl)oxalate; bis(3,4,6-trichloro-2-{[(2,4-dimethylphenyl)methoxy] carbonyl}phenyl)oxalate; bis(3,4,6-trichloro-2-{[3,4-dimethylphenyl) methoxy] carbonyl}phenyl) oxalate; bis(3,4,6-trichloro-2-{[(3,5-dimethylphenyl)methoxy] carbonyl}phenyl)oxalate; bis(3,4,6-trichloro-2-{[(2,6-dimethylphenyl)methoxy] carbonyl}phenyl)oxalate; bis(3,4,6-trichloro-2-{[(2-ethylphenyl)methoxy]carbonyl} phenyl)oxalate; bis(3,4,6-trichloro-2-{[(3-ethylphenyl)methoxy]carbonyl} phenyl) oxalate; bis(3,4,6-trichloro-2-{[(4-ethylphenyl)methoxy] carbonyl} phenyl)oxalate; bis(3,4,6-trichloro-2-{[2-(2-methylphenyl)ethoxy]carbonyl} phenyl)oxalate; bis(3,4,6- trichloro-2-{[2-(3-methylphenyl)ethoxy]carbonyl} phenyl)oxalate; bis(3,4,6-trichloro-2-{[2-(4-methylphenyl) ethoxy] carbonyl} phenyl)oxalate; bis{3,4,6-trichloro-2-[(2-phenylpropoxy)carbonyl] phenyl}oxalate; bis{3,4,6-trichloro-2-[(3-phenylpropoxy)carbonyl] phenyl}oxalate; bis{3,4,6-trichloro-2-[1-naphthalenylmethoxy)carbonyl] phenyl}oxalate; bis{3,4,6-trichloro-2-[2-naphthalenylmethoxy)carbonyl] phenyl}oxalate; bis{3,4,6-trichloro-2-[(2,2-diphenylethoxy)carbonyl] phenyl}oxalate; bis{3,4,6-trichloro-2-[(9-fluorenylmethoxy)carbonyl] phenyl}oxalate; and bis{3,4,6-trichloro-2-[(9-anthracenylmethoxy)carbonyl] phenyl}oxalate, or mixtures thereof.

8. The chemiluminescent projectile having multi-spectral output according to claim 1, wherein said at least one fluorescer includes 1-methoxy-9,10-bis(phenylethynyl) anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4-methoxyphenyl) anthracene; 9,10-bis(phenylethynyl) anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-dineopentyl-3,4,9,10-perylene dicarboximide; 1,6,7,12-tetra(p-t-butylphenoxy)-N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene, or mixtures thereof.

9. The chemiluminescent projectile having multi-spectral output according to claim 1, wherein said at least one catalyst includes sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichloro-salicylate; magnesium-3,5,6-trichlorosalicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles, tribenzylamine, dibenzylethylamine, dibenzylmethylamine, or mixtures thereof.

10. The chemiluminescent projectile having multi-spectral output according to claim 1, wherein said at least one peroxide includes hydrogen peroxide, sodium peroxide, sodium perborate, sodium pyrophosphate peroxide, urea peroxide, histidine peroxide, t-butylhydroperoxide, sodium percarbonate; peroxybenzoic acid, or mixtures thereof.

11. The chemiluminescent projectile having multi-spectral output according to claim 1, wherein said chemical dispersant visualizing agent(s) is/are shaped objects, materials, or particles that bounce in or along said vertical direction or plane, said horizontal direction or plane, or said vertical and horizontal directions or planes.

12. The chemiluminescent projectile having multi-spectral output according to claim 1, wherein said inert ballast material is marble dust or other form of calcium carbonate.

13. The chemiluminescent projectile having multi-spectral output according to claim 1, further including a dye mixed with said inert ballast material.

14. The chemiluminescent projectile having multi-spectral output according to claim 1, further including thickening agents.

15. The chemiluminescent projectile having multi-spectral output according to claim 1, further including high lofting fluorescent powders.

* * * * *